May 19, 1959 — F. C. KOCH — 2,887,307
INDUSTRIAL WATER COOLING TOWER
Filed Sept. 20, 1956
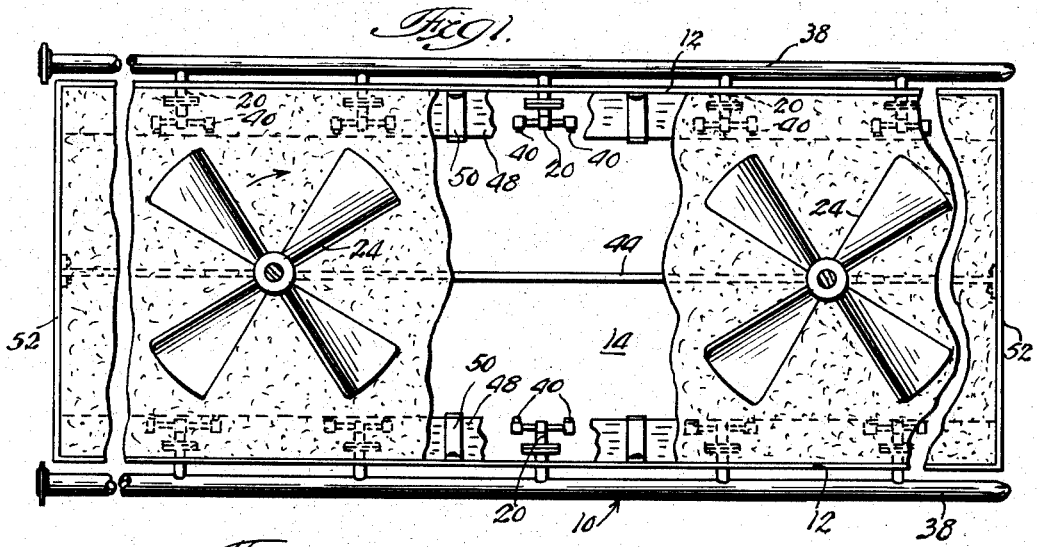
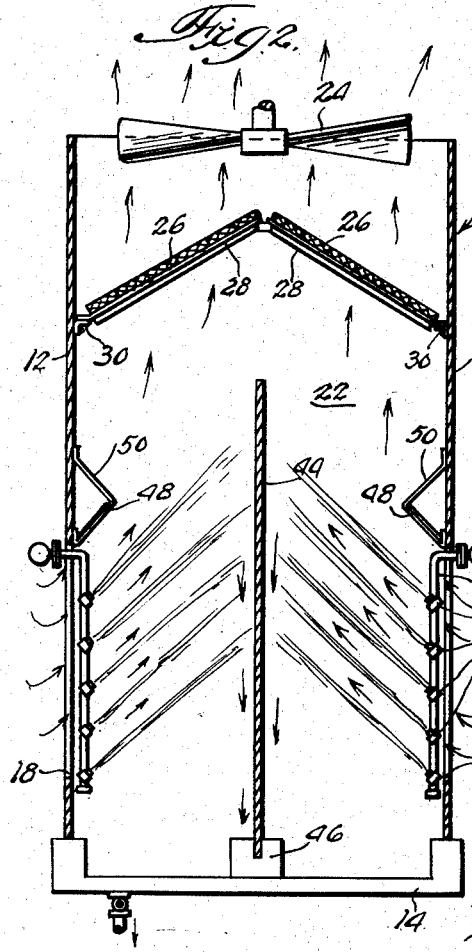
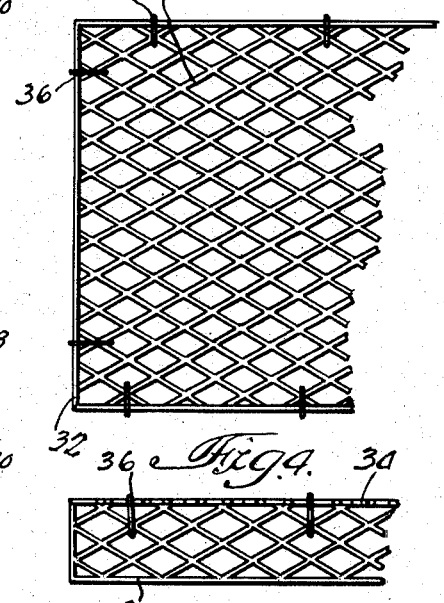
INVENTOR.
Fred C. Koch.

United States Patent Office 2,887,307
Patented May 19, 1959

2,887,307
INDUSTRIAL WATER COOLING TOWER

Fred C. Koch, Wichita, Kans., assignor to Koch Engineering Company, Inc., Wichita, Kans., a corporation of Kansas Application September 20, 1956, Serial No. 610,927

3 Claims. (Cl. 261—24)

The present invention relates to an improved industrial water cooling tower and is a continuation-in-part of my copending application Serial No. 544,284, filed November 1, 1955.

In substantially all industrial operations in which cooling water is used, it is more economical to cool and reuse the warmed water rather than discard it to waste. Cooling of the water is effected by contacting it with unsaturated air. When water comes in contact with air having a wet bulb temperature which is lower than the temperature of the air, the water is rapidly cooled by evaporation. If the unsaturated air is cooler than the water contacted, the water is also cooled by transfer of sensible heat to the air. To provide the largest water surface area possible for contact with the air, the warm water is finely subdivided or atomized by being sprayed through a nozzle into the cooling tower chamber.

Industrial cooling towers are divided into two general classes. The first class is an atmospheric type and the second class is a mechanical draft cooling tower, in which mechanical means are employed for drawing or forcing air currents through the tower for purposes of cooling water. In the atmospheric type tower, air currents of the surrounding atmosphere are employed for water cooling purposes. In the mechanical draft type, fan means are usually utilized for purposes of drawing in or forcing air through the tower enclosure to contact water sprays which are preferably composed of fine particles. In the mechanical draft cooling tower, it is desirable that the resistance to the flow of air through the tower be maintained at a minimum so as to insure a low pressure drop across the tower. As a result, power consumption of the fan or other draft-creating means is maintained at a minimum.

In my copending application a cooling tower construction was disclosed in which spray members were disposed at opposed bottom side portions of a central open top tower enclosure. A draft inducing means, such as a fan, was disposed adjacent the upper end limit of the tower for purposes of withdrawing the air from within the tower and dispersing it to the surrounding atmosphere. The water from the oppositely disposed sprays was directed normally to the vertical axis of the tower. An air-permeable water-deentraining section was disposed beneath the fan means in the tower for trapping any water mist entrained in the flowing air.

In a second tower construction disclosed, the sprayed water was directed downwardly toward the bottom of auxiliary spray chambers adjoining a central tower enclosure having a fan disposed in its open upper end portion. The latter tower was in communication with the auxiliary chambers by means of opposed tower openings in which an air-permeable water-deentraining material was disposed. In each of these tower constructions the sprayed water covered distances of short length and the air pulled into the tower followed an irregular flow path.

In accordance with the teachings of this invention, it has been found that by disposing the spray means in a mechanical draft-cooling tower in a predetermined manner, the cooling efficiency of the tower may be greatly increased. It has also been found that by employing spray nozzles which produce sprays having a predetermined maximum included angle, the air flow and dependent efficiency of the tower is favorably affected.

It is an object of this invention, therefore, to provide an induced draft-cooling tower which is simple in details of construction, inexpensive to erect and maintain, and highly efficient in operation.

It is another object of this invention to provide a cooling tower employing spray members which are predeterminately disposed in such a manner so as to insure maximum cooling by the air currents flowing therethrough.

It is yet another object of this invention to provide an industrial cooling tower employing predeterminately disposed baffle members which assure efficient fluid flow of air through the tower.

It is a still further object of this invention to provide an industrial cooling tower employing nozzles which produce sprays having a predetermined included angle, which angle insures maximum air flow and cooling efficiency.

The above and other objects of this invention will become more apparent upon proceeding with the following description, read in the light of the accompanying drawing and the appended claims.

In one embodiment of the cooling tower provided, a vertical enclosure is provided having an open upper end limit which is in direct communication with the surrounding atmosphere. The enclosure has oppositely disposed sides which are apertured; batteries of spray means are uniformly disposed along these apertures. A fan means or other draft-inducing means is disposed adjacent the open upper end limit of the enclosure and has, as its main function, the withdrawal of air from the underlying tower passageway or enclosure for dispersal into the surrounding atmosphere. Air enters the provided enclosure by means of the oppositely disposed apertures or openings in the side walls. In the normal course of operation, water is sprayed in an upward direction into the tower enclosure chamber through the spray means. The fan means continually draws air into the central tower chamber through the openings disposed in the opposed side walls during the course of the spraying operation. Each of the nozzle means of the spray means is adapted to produce a spray having a predetermined included angle.

Disposed in the upper portion of the tower chamber adjacent, but below, the fan means is a water-deentraining section, the purpose of which is to prevent passage of fine water particles or mist, with the moving air currents, to the surrounding atmosphere. The water-deentraining section readily allows the passage of air currents so as not to create a pressure drop of appreciable size in the tower and yet retains all water particles within the tower enclosure.

Centrally disposed in the tower enclosure between the opposed spray means and substantially normally disposed to each of the spray batteries is a vertical plate or baffle member, the purpose of which is to prevent the occurrence of eddies in the central portion of the tower enclosure whereby efficient flow of the air through the tower is assured. The water which emerges from the nozzle members is sprayed upwardly so that spray nozzles preferably form an angle of about between 30 and 45 degrees with the vertical. After contacting the centrally disposed baffle member, the sprayed water flows downwardly into an underlying collecting basin which is in communication with apparatus requiring use of the cooled water by means of an interconnected valved conduit. For a more complete understanding of this invention, reference should now be had to the drawing, wherein:

Figure 1 is a fragmentary top plan view of a cooling tower made in accordance with the teachings of this invention;

Fig. 2 is a vertical sectional view, partly in elevation, of the cooling tower illustrated in Fig. 1;

Fig. 3 is a fragmentary top plan view of a portion of the water-deentraining means utilized in the provided cooling tower; and Fig. 4 is a side elevational view of a portion of the water-deentraining section illustrated in Fig. 3.

Referring now to the drawing, and more particularly to Fig. 2, an industrial cooling tower 10 constructed in accordance with the teachings of this invention is illustrated. The tower comprises opposed wall members 12 which are vertically disposed and which rest on an underlying basin portion 14 which, in effect, defines the bottom end limit of the cooling tower 10. It will be noted that the opposed walls 12 are elongate (see Fig. 1); their length which determines the tower size is in turn determined by the desired cooling needs of the system with which associated.

The lower portion of each of the opposed tower walls 12 has an elongate opening 18 disposed therein which opening runs the length of each of the walls. Disposed in the openings 18 at predetermined intervals are spray batteries 20. As will be more clearly seen from Fig. 1, the spray batteries have ample space in-between, whereby air may freely enter into a central tower chamber 22 in which the water cooling process is effected.

As previously mentioned, the cooling tower provided is a mechanical draft tower and consequently employs a means for inducing air currents to flow therethrough, such as a fan member 24, clearly shown at Figs. 1 and 2. The fan members 24 are disposed at predetermined intervals along the length of the tower 10 adjacent the open upper end limit thereof (see Fig. 1).

Interposed between the batteries 20 and the fan means 24 are water-deentraining sections 26 which are placed across the entire upper end portion of the tower 10. The water-deentraining sections 26 may be supported by channel member 28, such as are illustrated in Fig. 2, which are in turn secured in their elevated position by means of angle members 30 which are welded or otherwise suitably affixed along the length of the wall members 12 of the tower.

The water-deentraining sections 28 are adapted to allow air currents which cool the sprayed water, as will hereinafter be explained in greater detail, to readily pass therethrough into the surrounding atmosphere. However, the deentraining sections 28 will not permit water, even in fine particle, or mist, form to traverse the thickness thereof. Consequently, all water passing through the spray batteries 20 remains in the tower central chamber 22. There is negligible loss of water to the atmosphere with the provided tower construction.

Figs. 3 and 4 illustrate means for housing water-deentraining material, such as glass wool, and enabling the latter material to be disposed in a fixed position as illustrated in Fig. 2. Figs. 3 and 4 are fragmentary views of an expanded metal enclosing basket 32 in which compressed glass wool is inserted and secured. Fig. 4 is a side elevation of the bottom basket portion 32 made of expanded metal to which a top cover portion 34 of expanded metal may be secured, for instance, by means of wire 36. Thus, in the normal position of use, the glass wool which serves to filter out water mist and yet enables air to pass therethrough is in a firm and secure position. The angular disposition of the two water-deentraining sections 26 as illustrated in Fig. 2 is for the obvious purpose of providing maximum exposed surface area for water-deentraining purposes.

In the normal course of tower operation, water enters each of the spray batteries 20 from a header 38 disposed along opposite wall portions 12 of the tower. The latter headers are in turn in fluid communication with apparatus (not shown) utilizing cooling water. The water from the headers 38 enters the spray batteries 20 and emerges through nozzles 40 disposed in each of the spray batteries. As is more clearly seen from Fig. 2, the nozzles 40 of each battery are upwardly inclined so as to send sprays of water into the tower chamber 22 in an upward direction. As a result of this latter nozzle disposition it is apparent that the water particles emerging from the nozzles 40 travel a greater distance and consequently will be in contact with the cooling air currents for a longer period of time before reaching the central portion of the tower chamber as compared with water emerging from nozzles normally disposed to the vertical tower axis. The angular disposition of the nozzles is therefore seen to be a critical factor in producing optimum tower cooling efficiency.

In addition to a longer water-air contact, the upward angular disposition of the nozzle members 40 facilitates the flow of air into the tower chamber 22 through the longitudinal openings 18 disposed in the opposed side walls 12. The angular disposition of the nozzles, therefore, not only insures longer air-water contact, but, in addition, by being directed upwardly, tends to induce air currents entering the tower chamber to also flow in an upward direction, thereby facilitating passage of the air through the tower and reducing pressure drop and power consumption of the draft-inducing means 24 to a minimum.

It is, therefore, seen that the flow of air through the tower chamber 22 is in part caused by the fans 24 and also by the movement of the water from the nozzles 40 of the spray batteries in an upwardly direction.

Disposed in the center of the tower chamber 22, parallel to the opposed side walls 12, is a baffle member 44. The latter baffle precludes the formation of eddies in the central tower chamber which would form as a result of the meeting of the opposed sprays emerging from the opposed batteries 20. Although the centrally disposed baffle member 44 is illustrated as being fixedly positioned as a result of being imbedded in a foundation block 46, it should be noted at this time that the baffle member 44 may be removable from the central portion of the chamber. The tower 10 could function without the centrally disposed baffle member 44 should the spray batteries 20 disposed in one side wall aperture 18 be inactivated, allowing only opposed batteries of spray members to function. Such being the case, there would be no danger of eddies forming in the central portion of the tower enclosure. Thus, if the baffle member 44, were removed, the sprays emerging from the nozzles 44 would be enabled to travel a still greater distance in the tower chamber, during which time they would constantly be cooled by the induced air currents flowing into the side wall opening 18 to the upper open end limit of the tower. It should also be noted at this time that the illustrated tower construction may be constructed with batteries of spray members disposed along only one side thereof. In such a tower design there would obviously be no need for employing a centrally disposed baffle member.

Positioned immediately above each of the opposed series of spray batteries is a trough member 48 which is secured in fixed position by supporting strap members 50 which are in turn secured to the inner surfaces of each side wall member 12. It is the function of these latter troughs 48 to obviate the formation of eddies immediately above the spray members, thereby facilitating air flow through the tower chamber. It is also a secondary function of these trough members 48 to prevent water flowing down the inner surfaces of the tower walls from passing over the spray members and the opening 18 in each side wall. Each trough 48 connects at either end limit with the underlying basin 14 of the tower construction which collects the cooled sprayed water.

As previously mentioned, the tower walls 12 may have any desired length which conforms with the desired cooling capacity. Obviously, end walls 52, which are illustrated in Fig. 1, will be disposed at end limits of every tower construction. The number of spray batteries and fan members employed will, of course, be dependent upon the tower length.

As has also been previously mentioned, the angular disposition of the spray nozzles 40 is of critical importance in determining the efficiency of the entire tower construction. By proper disposition of the nozzle, the distance which the sprayed water will travel is increased and the amount of cooling air which is drawn into the tower chamber by means of the sprayed water is maintained at a maximum. Consequently, the angle of the spray nozzles 40 insures long air-water contact and consequently a cooler water product, and, in addition, facilitates the passage of air through the tower so that the pressure drop through the tower is maintained at a minimum and the power requirements of the fan or other draft-inducing means is also maintained at a minimum.

Another tower design feature which will assist in the passage of air through the tower and consequently increase tower efficiency comprises the included angle of the water sprays emerging from each nozzle member 20. It is believed apparent that if the included angle of the sprayed water is too great, the formation of eddies rapidly takes place and, in addition, the entrainment of air is reduced and the flow of air through the tower is rendered more difficult. By utilizing nozzle members 20 in which the included angle of the spray emerging from each nozzle member is between 40 and 60 degrees, efficiency of operation is assured in that large volumes of air are entrained in the water, eddies are maintained at a minimum, and flow passage of air currents is facilitated.

Thus it is seen that a water cooling tower which employs mechanical means for inducing the flow of air currents therethrough has been provided which, although simple in details of construction, is advanced as being the most efficient of its type. By disposing the fan means at the top of the tower 10 recirculation of discharged moisture-laden air is minimized. There is no packing or other material disposed in the central tower chamber to obstruct free passage of air. Despite the absence of packing, however, the sprayed water is assured of long contact with the induced air currents, and efficient cooling results. The provided water-deentraining means 26 maintains the loss of water to the atmosphere at a bare minimum. By utilizing the above-described nozzle members and baffle members, air passage through the tower is facilitated, and efficiency of cooling accordingly increased.

It is believed apparent from the foregoing that many modifications may be made in the illustrated apparatus which will still remain in the ambit of the inventive concepts disclosed. For instance, as above mentioned only one side wall of a tower construction need have spray batteries. With such a construction, a central baffle member is unnecessary. It is intended, therefore, that this invention be limited only by the scope of the appended claims.

I claim:

1. In a cooling tower, the combination comprising an enclosure having opposed side openings in direct communication with the surrounding atmosphere, spray means arranged in batteries disposed in said opposed side openings for ejecting liquids to be cooled into said enclosure in an upward direction, the spray means of each battery being in substantially the same vertical plane, said fluid ejected from said spray means causing the atmosphere exterior of said enclosure and adjacent said spray means to be induced to enter said enclosure, means for withdrawing the atmosphere from within said enclosure arranged adjacent an upper end portion thereof and disposed substantially intermediately of said spray means' battery planes, stop surface means against which the liquid sprays emerging from said spray means impinge disposed between said spray means, said stop surface means being in substantially parallel relationship with said opposed spray means' planes and located substantially intermediately of said spray means and in substantial vertical alignment with said atmosphere withdrawing means, substantially all of said liquid spray emerging from said spray means impinging against said stop surface means and descending to said enclosure bottom in sheet form whereby the formation of eddies by said liquid spray in the center of said enclosure is substantially completely obviated, said atmosphere induced to enter said enclosure flowing over such liquid sheets and proceeding upwardly through said enclosure upper end portion in a substantially smooth continuous flow in the normal course of tower operation unobstructed by spray and air eddy currents.

2. The tower as recited in claim 1 in which the sprayed liquids define an angle of between about 45° and 60° with the horizontal plane.

3. The tower as recited in claim 1 in which the included angle of each of the liquid sprays ejected from said spray means is between about 40° and 60°.

References Cited in the file of this patent

UNITED STATES PATENTS

| 1,545,123 | Burhorn | July 7, 1925 |
|---|---|---|
| 2,022,740 | Rowell | Dec. 3, 1935 |
| 2,199,632 | Keyes | May 7, 1940 |
| 2,247,514 | Mart | July 1, 1941 |
| 2,648,395 | Pond | Aug. 11, 1953 |
| 2,680,603 | Taylor | June 8, 1954 |
| 2,802,543 | Clark | Aug. 13, 1957 |

FOREIGN PATENTS

| 11,321 of 1896 | Great Britain | Apr. 10, 1897 |